March 16, 1965  J. STUART III  3,173,490
PROPELLER BLADE FOR VTOL AIRCRAFT
Filed July 25, 1962  2 Sheets-Sheet 1

Vertical Flight

Forward Cruise Flight

INVENTOR.
Joseph Stuart III
BY
Attorneys

March 16, 1965  J. STUART III  3,173,490
PROPELLER BLADE FOR VTOL AIRCRAFT
Filed July 25, 1962  2 Sheets-Sheet 2

INVENTOR.
Joseph Stuart III
BY Bialos + Schlemmer
Attorneys

3,173,490
PROPELLER BLADE FOR VTOL AIRCRAFT
Joseph Stuart III, Redondo Beach, Calif., assignor, by mesne assignments, to Hiller Aircraft Company, Inc., Menlo Park, Calif., a corporation of Delaware
Filed July 25, 1962, Ser. No. 212,346
3 Claims. (Cl. 170—159)

This invention relates generally to a propeller construction. More particularly, this invention relates to a propeller construction for a vertical take-off and landing (VTOL) aircraft, which comprises a plurality of blades operatively connected with and radiating from a propeller hub about the axis of which the propeller construction is rotatable for effecting propulsion of the aircraft.

Still more particularly, this invention relates to a particular propeller blade for use in a propeller construction which is effective to the maximum degree when employed with a VTOL aircraft during hovering flight, vertical rising or descending flight, or forward cruise flight. To this end each blade of the propeller construction is provided with a particular contoured low twist configuration, as hereinafter described, so that the propeller construction is highly effective and efficient under all flight conditions for a VTOL aircraft.

Briefly summarizing this invention, the same relates to a low twist multibladed propeller construction in which each blade of the propeller construction is defined by an inboard blade portion and an outboard blade portion integrally connected with each other by an intermediate transitional blade portion lying between the inboard and outboard portions. The inboard portion of each blade is provided with a transverse cross-sectional configuration at any given radius section therealong which is symmetrical, or generally symmetrical, and which has little or no camber. The outboard portion of each blade is provided with a transverse cross-sectional configuration at any given radius section therealong which is non-symmetrical and which has a high degree of camber. The intermediate transitional portion of the blade is provided with a progressively changing cross-sectional configuration which changes relatively rapidly outwardly of the blade from the symmetrical or generally symmetrical non-cambered configuration of the inboard portion into the high cambered non-symmetrical configuration of the outboard portion. Each blade portion is of relatively well defined extent and forms a predetermined part of the total length of the blade.

Furthermore, the twist of each blade is of relatively low degree compared to similar forward speed application, conventional blades. The degree of twist decreases progressively from the inboard blade end toward its tip.

The blade of this invention primarily is designed to decrease profile drag consumption of lightly loaded propellers at maximum speeds as well as at cruise speeds. That is, by employing novel inboard and mid-blade airfoil sections in a low twist blade, blade profile power losses which usually are encountered by a normally cambered blade at high forward speeds (e.g., 250 m.p.h. and above) are greatly reduced.

Heretofore known propeller constructions for VTOL aircraft generally employed blades each of which was defined by a comparatively highly cambered non-symmetrical cross-sectional configuration which extended from the inboard end of the blade for the majority of the length thereof. For the remainder of such blade length, the cambered configuration of the blade was progressively washed out toward the blade tip.

Additionally, prior known VTOL blades generally were provided with a high degree of twist which decreased gradually from the blade inboard end towards the blade tip. The subject invention, however, is directed to a low twist propeller blade in which the degree of twist of the blade is appreciably less at any given radius section than the degree of twist employed at a corresponding radius section in heretofore used conventional blades.

The thickness of the subject blade progressively decreases from the inboard end to the tip so that the blade has a tapered construction. In this regard, the subject blade is thicker in its inboard portion than was the case with heretofore used blades for a purpose to be described.

Aircraft capable of vertical take-off and landing require propeller blades having large blade areas to produce the requisite thrust required to sustain the aircraft during hovering or vertical movement. However, such large blade areas are not required when the VTOL aircraft is oriented for forward cruise flight generally as a conventional fixed wing aircraft because less thrust is required to sustain the aircraft during forward flight due to the effectiveness of the aircraft wing structure.

That is, when a VTOL aircraft is hovering or moving vertically, the entire weight of the aircraft must be supported and sustained solely by the thrust produced by the rotating propellers. However, when the aircraft is moving forwardly in cruise flight, the thrust required to support the aircraft due to lift provided by the wings may be only one-tenth of the weight of the aircraft. Therefore, when the aircraft is cruising forward, the propellers heretofore used are lightly loaded and, as a result, are generally inefficient.

Accordingly, in an attempt to counteract such propeller inefficiency, it has been common in forward cruise flight to substantially reduce the speed of rotation of the propellers a substantial amount, for example to about seventy percent of hovering r.p.m. By thus reducing the r.p.m. of the propeller blades, it is attempted to maintain maximum load on the blades and to thereby minimize the drag produced by the blades. But speed reduction is effective for its intended purpose only to a given point because any reduction much below the exemplary level mentioned above has been found to be undesirable due to turbine engine power, turbine efficiency reductions and propeller drive system torque limitations.

That is, it has been found with conventional VTOL blades of the type described which have a relatively high degree of twist and which are relatively highly cambered at their inboard portions that reduction of the propeller r.p.m. during forward cruise flight cannot be employed sufficiently effectively to preclude formation of undesirable amounts of drag by the blades. Heretofore known blades when lightly loaded produce too much drag and, accordingly, very low efficiency results from use of such blades during forward cruise flight.

The subject propeller blade has been developed to correct this situation by cutting down on the drag produced by the propeller blades during lightly loaded forward cruise flight. Briefly, this has been done by developing a high lift capacity blade for hovering and vertical flight which is also highly efficient during lightly loaded forward cruise flight.

To this end, the subject blade is designed to be generally symmetrical with little or no camber throughout a well defined inboard portion thereof which rapidly transforms into a non-symmetrical chambered well defined outboard portion thereof. Such a blade having a cambered tip portion and a zero or low cambered inboard portion, with a relatively rapid intermediate transitional portion therebetween, eliminates or greatly reduces undesirable drag losses of the type mentioned.

Furthermore, by employing a tapered blade which has a low degree of twist, during forward cruise flight the positive thrust produced by the blade is carried by the relatively thin, relatively highly cambered blade tip portion. That is, the aerodynamic loading during conventional forward flight is concentrated at the cambered blade tip.

The inboard blade portion in forward cruise flight sustains a low, zero, or even negative windmilling load. The profile drag produced by the inboard blade portion under such conditions has been reduced by employing blade sections having relatively thick and generally non-cambered cross sections which give low profile drag coefficient values at low positive, zero or even negative angles of attack. However, the generally symmetrical uncambered inboard blade portion of substantial thickness ratio is capable of developing high lift values in the positive thrust direction when the aircraft is hovering or moving vertically. Because the inboard blade portion operates at a lower speed than the tip portion, thicker sections which are effective at low speeds are used inboard.

The thus designed propeller blade, which departs radically from the blade construction heretofore frequently employed with VTOL aircraft, is effective and highly efficient under all flight conditions of a VTOL aircraft. Accordingly, during forward cruise flight of a VTOL aircraft which employs propeller constructions embodying blades of this invention, the r.p.m. of the propellers may be reduced to a suitable cruise value in which the blades are generally lightly loaded with the load being concentrated at the blade tip portions. As a result, the inboard portions of the blades do not set up unnecessary drag losses which would counteract the efficiency of the outboard tip portions. To the contrary, the inboard blade portions have been designed to enhance, rather than detract, from the efficiency of the propeller construction.

Propeller blade weight in VTOL aircraft also is an important consideration. Accordingly, a lightweight blade construction of the type disclosed in my Patent No. 2,981,337 dated April 25, 1961, may be employed in conjunction with the present invention if so desired.

With the foregoing in mind, objects of this invention include the provision of a light weight propeller construction for a VTOL aircraft; the provision of a VTOL propeller blade which is highly efficient and minimizes drag losses during all flight conditions of a VTOL aircraft; the provision of a VTOL propeller construction and blade in which the blade has a relatively low twist; and the provision of a VTOL propeller construction and blade in which the blade is defined by a generally symmetrical and uncambered inboard portion which rapidly changes into a cambered non-symmetrical blade outboard tip portion.

These and other objects will become apparent from a study of the following detailed description in which reference is directed to the accompanying drawings.

FIG. 1 is a plan view in somewhat schematic form of a multibladed propeller construction embodying features of this invention;

FIGS. 2 and 3 are illustrative transverse cross-sectional views through inboard and outboard blade portions taken in the planes of line 2—2 and 3—3 of FIG. 1;

This invention makes use of the known principle that relatively thick, generally symmetrical propeller blade sections are effective at lower speeds to provide desired thrust, but that such thick sections are generally ineffective at high speeds. Accordingly, in the subject construction the inboard low speed portion of each blade has a relatively high thickness dimension when compared to the outboard high speed blade tip portion. However, the thin outboard blade portion, as mention previously, is relatively highly cambered compared to heretofore employed conventional blades, to produce the high thrust required during vertical flight. Coupled with this construction involving a thick generally symmetrical inboard portion and a thin cambered outboard portion is the employment of a blade having a comparatively low blade twist angle as compared to the degree of twist of heretofore employed conventional blades.

The combination of these features presents a highly effective propeller blade construction which is usable with maximum effectiveness during all flight conditions of a VTOL aircraft. Because blades having cambered inboard portions produce high drag when lightly loaded, such as when the aircraft is in forward cruise flight, blades embodying cambered inboard portions have been found undesirable for VTOL aircraft. By employing blades having cambered configurations only at the outboard portions thereof, as disclosed herein, the profile power consumption of the blades is materially reduced while the profile drag of the blades is similarly minimized.

With the subject construction the aerodynamic loading on the blades is concentrated at the cambered blade tip portions during conventional forward cruise type flight so that the profile drag level is maintained at a very low level. That is, the drag coefficients of the inboard blade portions are reduced by the herein disclosed construction.

With the propeller construction disclosed herein during cruise flight, it is not necessary to greatly reduce the r.p.m. of the propeller construction in an attempt to keep the blades properly loaded, in that the cambered outboard portions are maintained loaded to insure good propeller efficiency.

Figure 1:
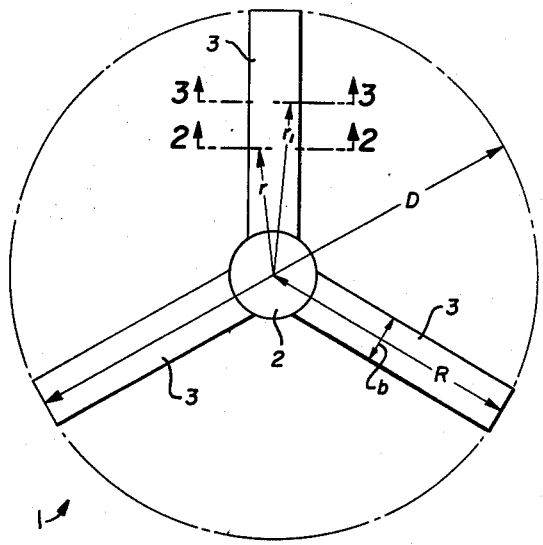

Referring now to FIG. 1, a multibladed propeller construction 1 is illustrated which comprises a hub 2 to which are operatively connected in any well known manner a plurality of radially extending propeller blades 3 each of which embodies the construction of this invention. Hereinafter, reference will be directed specifically to only one blade because of the identical construction of all blades employed. However, while three blades are illustrated in the propeller construction shown, it should be understood that the invention is equally applicable with propeller constructions for VTOL aircraft which employ less than or more than three blades.

In the drawings, the following reference characters are employed:

D—propeller construction diameter, i.e., diameter of the circular disc traced by the rotating blade tips;
R—propeller construction radius, i.e., effective length of each blade from the axis of rotation of the hub to the blade tip;
r—blade section radius, i.e., the distance a predetermined blade section lies from the propeller hub axis;
b—blade chord;
h—blade thickness at any given blade section radius;
B°—blade twist angle in degrees;
$C_L$—design lift coefficient (camber) at any given blade section radius;
r/R—section radius to tip radius ratio.

Figure 4:
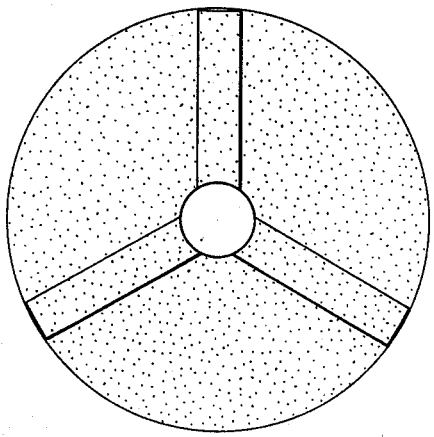
FIGS. 4 and 5 are generally schematic views of a propeller construction of this invention which illustrates the load conditions on the propeller construction when the aircraft with which such propeller is employed is in vertical flight, including hovering, and in forward cruise flight, respectively.
Figure 5:
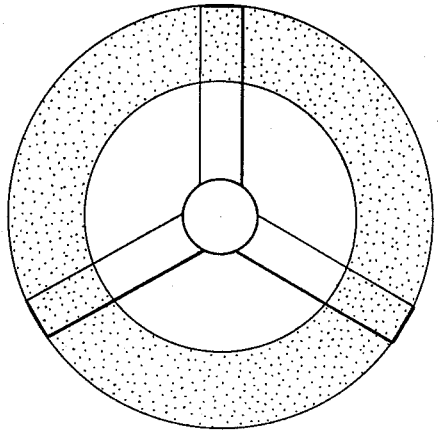

Before discussing the specific construction of the preferred embodiment of the subject propeller blade in detail, reference is directed to FIGS. 4 and 5 which illustrate the blade loading conditions which tend to result therewith during vertical flight and hovering (FIG. 4) and conventional forward cruise flight (FIG. 5). As noted by the stippled areas in these figures, during hovering and vertical flight, each low twist blade of the subject propeller construction is loaded for its full length for maximum efficiency and maximum thrust. However, during forward cruise flight, when less thrust is required, the load is concentrated at and sustained by the well defined thin cambered outboard portions of the respective blades.

Figure 8:
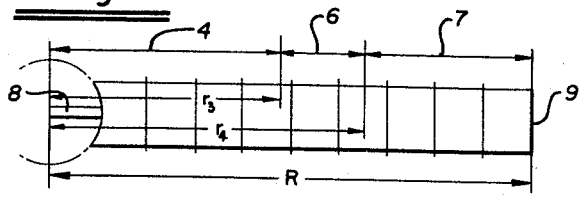
FIG. 8 is a plan view of a single blade of this invention embodying the characteristics established by the curve of FIG. 7.

For efficiency at these differing blade loading conditions, each blade of the subject construction is provided with a well defined generally symmetrical noncambered inboard portion 4 (see FIG. 8), an intermediate transitional portion 6, and a well defined non-symmetrical cambered outboard or tip portion 7.

Figure 7:
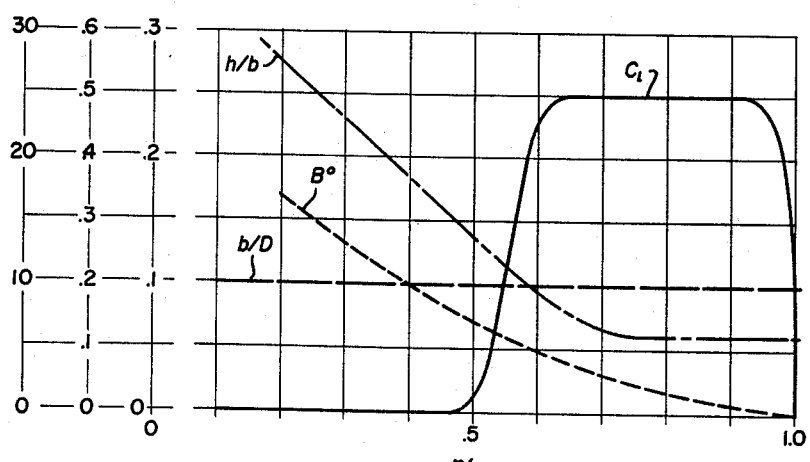

The exact construction and characteristics of the preferred blade embodiment are best illustrated in graph form by the various curves shown in FIG. 7 and reference hereafter is directed thereto.

With the specific embodiment disclosed, the blade width ratio (i.e., the blade chord-propeller diameter ratio $b/D$) is held constant due to the generally constant chordal dimension of the disclosed blade. This ratio in the described blade embodiment is maintained at approximately .1 as seen in FIG. 7. However, it should be understood that the actual blade chord employed at any given blade section is chosen as required for the particular thrust to be carried by the blade.

The degree of twist of the improved blade of this invention (B°) progressively decreases outwardly from the propeller hub toward the blade tip but is maintained at a low degree throughout. That is, the blade twist angle preferably does not exceed 35° at any given section radius of the blade. In this regard, a suitable maximum twist angle falls within the range of 10° to 25° in the inboard portion 4 of the blade. With the illustrated embodiment, the blade maximum twist is approximately 17°. Such twist angle decreases progressively toward the blade tip.

The blade section thickness ratio (i.e., the blade thickness-chord ratio $h/b$) decreases progressively from the blade inboard portion toward the blade tip. Adjacent the blade tip, such thickness ratio remains fairly constant for a predetermined distance. The thickness ratio curve reflects the progressively increasing thickness of the blade at any given radius section from the blade tip towards its inboard end.

As described previously, the cross-sectional configuration of the subject blade changes rapidly in the transitional intermediate blade portion 6 from a generally symmetrical low or zero cambered configuration in inboard portion 4 to a non-symmetrical cambered configuration in outboard portion 7. The design lift coefficient $C_L$ of the subject blade at any given blade radius section also is illustrated in FIGURE 7. As is known, the design lift coefficient is directly related to the curvature of the median line through a cross-section of a blade or, in other words, is directly related to the camber of the blade as the term is used herein.

Figure 6:
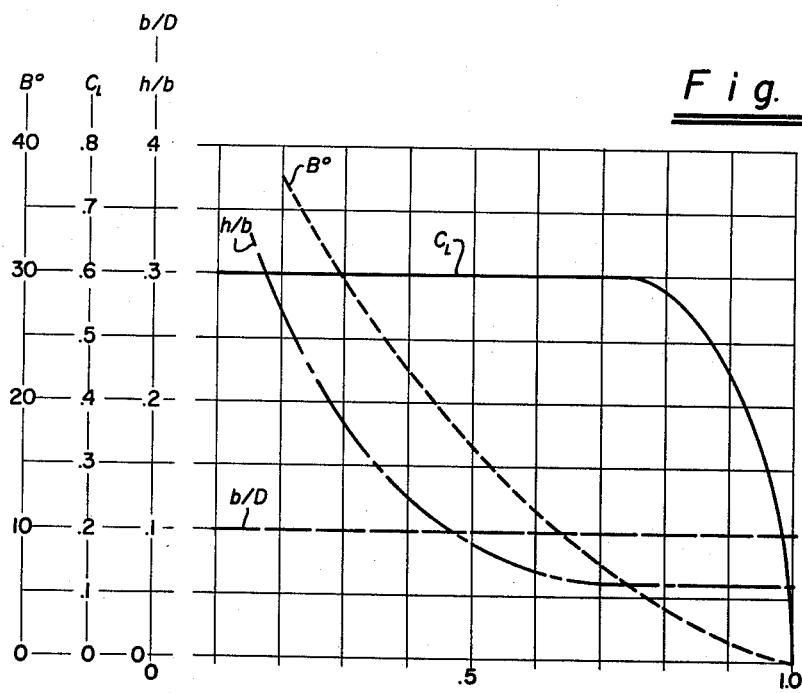
FIGS. 6 and 7 are curves illustrating the characteristics responsively embodied in a heretofore known conventional VTOL blade and in the improved blade of this invention.

A comparison of a heretofore known blade with the subject blade may readily be made by comparing FIG. 7 with the corresponding curves for a conventional blade as illustrated in FIG. 6.

While the blade width ratio $(b/D)$ is generally the same in both cases, the radical difference between the design lift coefficient $C_L$ (camber) at corresponding radius sections of the conventional blade and the improved blade of this invention is readily apparent. Also, the relatively low twist of the subject blade compared to the high twist employed for a conventional blade is apparent. Further, the decidedly higher thickness ratio $(h/b)$ throughout most of the inboard blade portion of the subject blade as compared to a known blade also is shown.

Desirably, the camber of the subject blade is maintained at a very low level or zero within the inboard blade portion 4 (defined by radius $r_3$ in FIG. 8) which extends from the inboard end 8 of the blade to a predetermined location falling within the range of .4 to .55 of the effective length of the blade (i.e., .4 to .55R). In this regard, the generally symmetrical low or zero camber inboard portion 4 preferably terminates at a radius section location lying within the range of .45 to .5 of the effective length of the blade (.45 to .5R). In the specific embodiment illustrated, the generally symmetrical inboard portion 4 of the blade terminates at approximately .473 of the effective blade length (.473R).

The transitional intermediate portion 6 of the blade commences where the inboard generally symmetrical portion ceases. In the blade embodiment illustrated in FIG. 7, such intermediate portion extends from the above defined predetermined location at which the inboard portion ceases to a second predetermined location lying within the range of .55 to .725 of the effective length of the blade (.55 to .725R). Preferably, the intermediate portion terminates at a second predetermined location which falls within the range of .625 to .675 of the effective blade length of the blade (.625 to .675R). In the specific embodiment illustrated, the transitional blade portion terminates at a radius section $r_4$ which is located at approximately .65 of the effective blade length (.65R).

The outboard highly cambered blade portion extends from the terminus of the transitional intermediate portion 6 to approximately the blade tip 9. It has been found desirable to design the subject blade with a lift coefficient falling within the range of .45 to .55. Preferably, a lift coefficient maintained at approximately .5 is employed with the subject blade from the terminus of the transitional blade section to closely adjacent the blade tip. Most advantageously, such lift coefficient is maintained constant within the range of .7R to .95R as seen in FIG. 7. From .95R the camber may be washed out to the blade tip if desired.

The contrast of the camber of a conventional VTOL blade is shown in FIG. 6. In such a blade, the highly cambered inboard section having a lift coefficient value of approximately .6 extends over the major length of the blade (to approximately .8R) before it is washed out at the blade tip.

Figure 2:
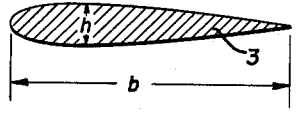
Figure 3:
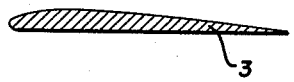

FIGS. 2 and 3 show illustrative blade cross-sectional configurations taken within the respective symmetrical inboard portion 4 and the cambered outboard portion 7 of the subject blade. FIG. 2 shows the generally symmetrical low or zero camber construction employed in the blade inboard portion as described previously. The blade section shown in FIG. 2 was taken at approximately .47R adjacent to the terminus of the inboard portion in the preferred embodiment of the blade illustrated. The blade section shown in FIG. 3 was taken at approximately .7R within the constant highly cambered outboard portion of the blade.

The two blade sections shown are for illustration only and generally correspond respectively to NACA (National Advisory Committee for Aeronautics) standard blade sections $63_2$–015 and 16–506. NACA has recently been superseded by NASA (National Aeronautics and Space Administration).

With the preferred embodiment specifically illustrated by the curves of FIG. 7, it should be noted that the improved VTOL blade of this invention is provided with a low degree of twist which is generally less than half the degree of twist employed with the conventional VTOL blade shown in FIG. 6. Similarly, the improved blade of this invention is thicker inboard of the .75R section to assure adequately high lift coefficient values for the low or zero camber inboard blade sections and to provide the increased structural stiffness and strength to resist the bending moments to which the blade is subjected during transitional flight.

While no specific disclosure has been made herein to well known propeller operating expedients, such as mounting the blades for variable pitch adjustment relative to the propeller hub, it should be understood that such expedients also may be incorporated into a propeller construction embodying this invention.

Having thus made a full disclosure of this invention, reference is directed to the appended claims. In this regard, modifications to the construction disclosed herein which may become apparent to one skilled in the art after this disclosure has been studied are contemplated as falling within the scope of the appended claims.

I claim:

1. A low twist angle propeller blade for a VTOL aircraft having an inboard portion, an outboard portion, and an intermediate transitional portion between and connecting said inboard and outboard portions, said inboard portion extending to a first predetermined location lying within the range of .4 to .55 the effective length of such blade and in transverse cross-sectional configuration being generally symmetrical and with a generally zero design lift coefficient, said outboard portion in transverse cross-sectional configuration being non-symmetrical and having a substantial design lift coefficient substantially to the tip of said blade, the transverse cross-sectional configuration of said blade in said intermediate portion changing relatively rapidly toward said tip from generally symmetrical and with a generally zero design lift coefficient to non-symmetrical and having a substantial design lift coefficient, said blade being twisted for substantially its full length, the degree of twist angle thereof being maximum in said inboard portion and decreasing progressively toward said tip, the maximum twist angle of such blade being less than 35°.

2. A low twist angle VTOL aircraft propeller construction comprising a plurality of propeller blades radiating from a central hub, said construction being rotatable about the axis of said hub; each of the said blades having a progressively decreasing thickness from adjacent said hub to the tip thereof, each said blade comprising a well defined relatively thick inboard portion, a well defined relatively thin outboard portion, and an intermediate transitional portion connection said inboard and outboard portions; said inboard portion extending to a first predetermined location which is spaced from said hub axis and lies within the range of .4 to .55 the effective length of such blade; said intermediate portion extending from said first predetermined location to a second predetermined location spaced from said hub axis which lies within the range of .55 to .725 the effective length of such blade; said outboard portion comprising the remainder of the length of said blade and extending from said second predetermined location substantially to said blade tip; said inboard portion in transverse cross-section being generally symmetrical and with a generally zero design lift coefficient; said outboard portion for at least the majority of its extent being non-symmetrical and having a design lift coefficient falling within the range of .45 to .55; said intermediate portion in transverse cross-section changing rapidly outwardly from generally symmetrical and with a generally zero lift coefficient to non-symmetrical and having a design lift coefficient falling within the range of .45 to .55; each said blade being twisted relative to its longitudinal axis throughout substantially its full length, the degree of twist angle thereof being maximum in said inboard portion and decreasing progressively toward said tip, the maximum twist angle of such blade being less than 35°.

3. A low twist angle tapered thickness VTOL aircraft propeller blade, the thickness of such blade decreasing progressively from its inboard end to its tip; said blade comprising a well defined relatively thick inboard portion, a well defined relatively thin outboard portion, and an intermediate transitional portion connecting said inboard and outboard portions; said inboard portion extending from adjacent said end to a first predetermined location spaced therefrom lying within the range of .4 to .55 the effective length of said blade; said intermediate portion extending from said first predetermined location to a second predetermined location lying within the range of .55 to .7 the effective length of said blade; said outboard portion comprising the remainder of the length of said blade from said second predetermined location to said tip; said inboard portion in transverse cross-section being generally symmetrical and with a generally zero design lift coefficient; said outboard portion in transverse cross-section being non-symmetrical and having a design lift coefficient falling within the range of .45 to .55; said intermediate portion in transverse cross-section changing relatively rapidly outwardly from generally symmetrical and with a generally zero lift coefficient to non-symmetrical and having a design lift coefficient falling within the range of .45 to .55; said blade being twisted relative to its longitudinal axis throughout substantially its full length, the degree of twist thereof being maximum adjacent said inboard end thereof and decreasing progressively toward said tip, the maximum twist of such blade being no more than 35°.

4. The VTOL propeller blade of claim 3 in which the degree of twist angle of said blade decreases from a maximum within the range of from 20° to 15° in said inboard portion to a minimum of 0° at said tip.

5. The VTOL propeller blade of claim 3 in which said first predetermined location lies within the range of from .45 to .5 the effective length of said blade, and in which said second predetermined location lies within the range of from .625 to .675 the effective length of said blade.

6. The VTOL propeller blade of claim 3 in which said maximum degree of twist angle does not exceed 20°.

7. A low twist angle tapered thickness propeller blade for a VTOL aircraft in which the thickness-chord ratio of said blade decreases progressively from adjacent its inboard end to its tip; said blade comprising an inboard portion, an outboard portion, and an intermediate portion connecting said inboard and outboard portions; said inboard portion extending from adjacent said end to a first predetermined location spaced therefrom within the range of .4 to .55 the effective length of said blade, said intermediate portion extending from said first predetermined location to a second predetermined location which is less than .7 the effective length of said blade, said outboard portion comprising the remainder of the length of said blade from said second predetermined location to said tip; said inboard portion in transverse cross-section being generally symmetrical and with a generally zero design lift coefficient, said outboard portion in transverse cross-section being non-symmetrical and having a generally constant design lift coefficient of approximately .5 for the majority of its extent, said intermediate portion in transverse cross-section changing rapidly outwardly of said blade from generally symmetrical and with a generally zero design lift coefficient at said first location to non-symmetrical and having a design lift coefficient of approximately .5 at said second location; said blade being twisted relative to its longitudinal axis throughout substantially its full length, the degree of twist angle thereof increasing progressively from said tip to a maximum adjacent said inboard end not exceeding 25°.

8. A propeller construction for a VTOL aircraft comprising a plurality of propeller blades operatively connected with and radiating from a propeller hub, each of said blades having an inboard portion, an outboard portion, and a relatively well defined intermediate transitional portion between and connecting said inboard and outboard portions, said inboard portion extending to a first predetermined location spaced from said hub and lying within the range of .4 to .55 the effective length of such blade and in transverse cross-sectional configuration being generally symmetrical and having a generally zero design lift coefficient, said outboard portion in transverse cross-sectional configuration being non-symmetrical and having a substantial design lift coefficient substantially to the outboard tip of such blade, the transverse cross-sectional configuration of such blade in said intermediate portion changing relatively rapidly toward said tip from generally symmetrical and with a generally zero design lift co-efficient to non-symmetrical and having a substantial design lift coefficient, said blade being twisted for substantially its full length, the degree of twist angle of said blade being relatively small and progressively decreasing from adjacent said inboard end to said tip.

References Cited in the file of this patent

UNITED STATES PATENTS

| | | |
|---|---|---|
| Re. 16,387 | Carter | July 20, 1926 |
| 1,460,230 | Monge | June 26, 1923 |
| 1,518,410 | Reed | Dec. 9, 1924 |
| 1,802,094 | Stuart | Apr. 21, 1931 |

FOREIGN PATENTS

| | | |
|---|---|---|
| 12,466 | Great Britain | of 1912 |